July 2, 1940.  J. V. CAPUTO  2,206,496
MOTOR CONTROL SYSTEM
Filed July 25, 1936  2 Sheets-Sheet 1

INVENTOR
James V. Caputo
by his attorneys
Stebbins Blenko & Parmelee

Patented July 2, 1940

2,206,496

UNITED STATES PATENT OFFICE 2,206,496

MOTOR CONTROL SYSTEM

James V. Caputo, Crafton, Pa.

Application July 25, 1936, Serial No. 92,595

6 Claims. (Cl. 172—239)

This is a continuation in part of my co-pending application Serial No. 678,425, filed June 30, 1933, which matured into Patent No. 2,052,965 on September 1, 1936.

This invention relates to a control system for motors, and, in particular, for a plurality of motors driving mechanisms simultaneously operating on a common workpiece. A multi-stand continuous mill for forming flat skelp into tube blanks is a typical example of installations which I have in mind and, while the invention will be described with particular reference to this example, it will be understood that it may be applied also to other similar installations.

The "setting up" of a forming mill is a rather delicate operation. Such mills usually comprise a relatively large number of roll stands, which have heretofore been driven from a common shaft. Briefly, the procedure has been to move a piece of skelp longitudinally through the several forming stands successively.

The drives heretofore used for forming mills have not been particularly well adapted for such installations, since they did not provide the flexibility desired. This was found to be true even when individual motors were used for driving the stands. Such flexibility demands the ability to drive a plurality of motors in either direction and to control their speeds simultaneously to the same degree, and the ability to keep the motors properly synchronized to prevent damage to the work as by scoring, stretching, buckling or even breaking, when the system is used to control motors driving machines fabricating material having little mechanical strength, such as paper.

I have invented a drive for a multi-stand mill including a motor for each stand and a motor control system which is capable of simultaneously starting the motors, operating them in synchronism in either direction with variable acceleration or deceleration, and stopping them very quickly by regenerative braking. The system further permits the speed of each motor to be adjusted independently to compensate for wear on the rolls. I also provide means for preventing the connection of any motor to its source of current if the voltage of the latter is above a predetermined magnitude. The system thus makes it possible to avoid injury to the material as by scoring, buckling or breaking, because the motors are maintained in synchronism at all speeds.

Figure 1A:
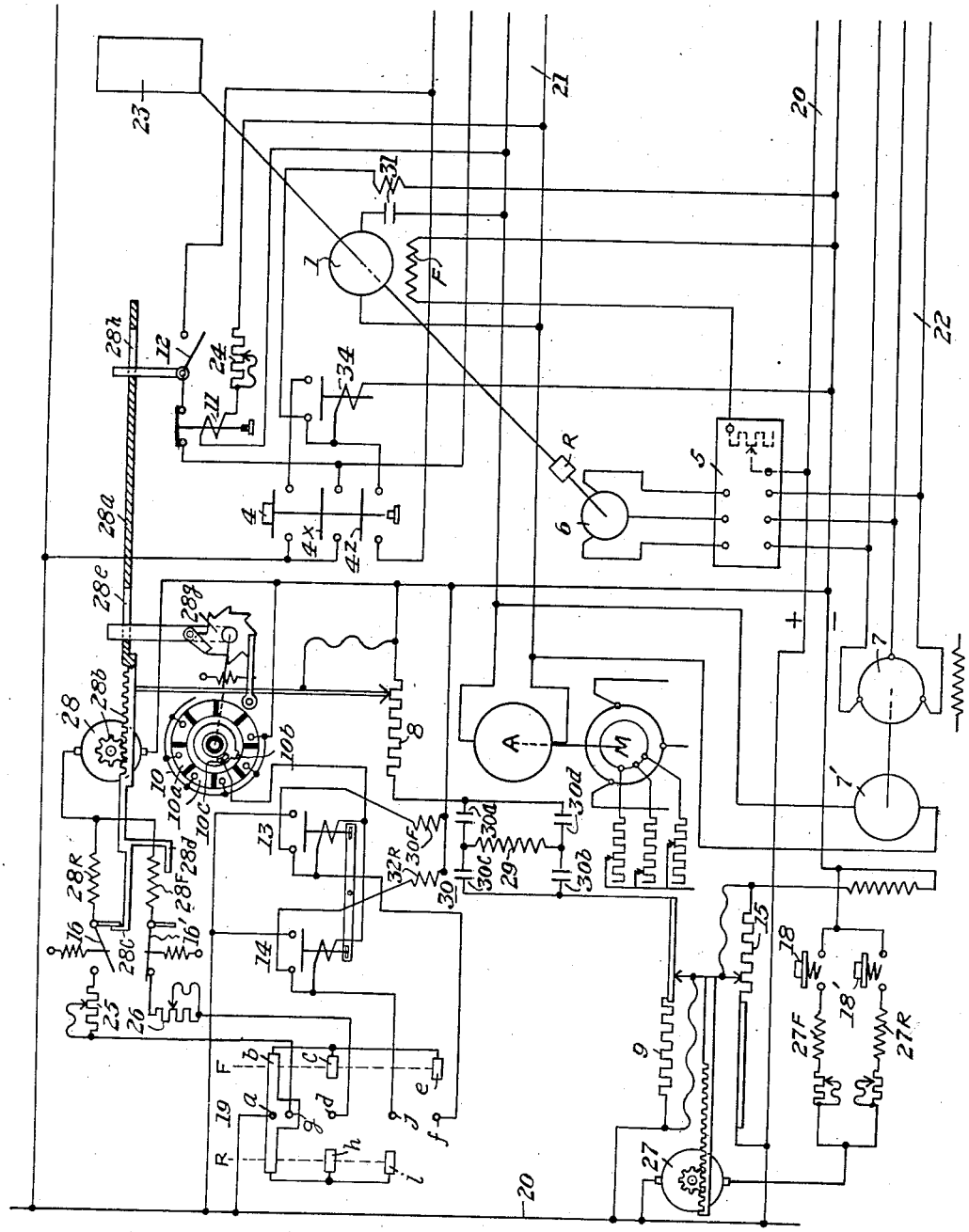
Figure 1B:
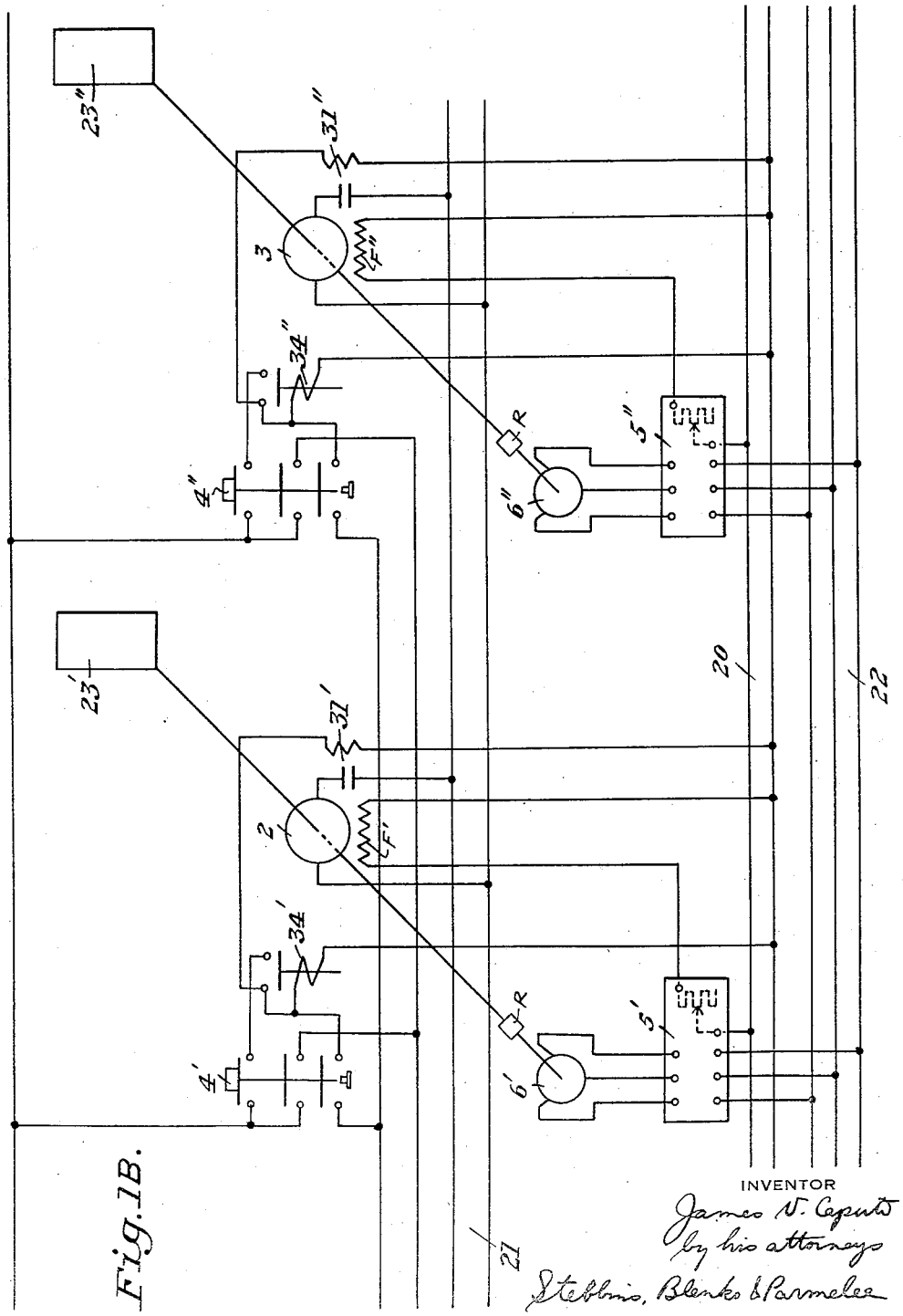

A detailed understanding of the invention may be obtained from the following description and the accompanying drawings illustrating diagrammatically a present preferred embodiment. In the drawings, Fig. 1A and Fig. 1B, when placed side by side, together constitute a diagrammatic showing of the apparatus and circuits involved.

Referring first only generally to the elements shown on the drawings, the system comprises a variable voltage generator A driven by any suitable type of motor M, preferably a variable speed motor. The generator A supplies current (preferably direct) to a plurality of motors 1, 2 and 3, constituting individual drives for a plurality of machines simultaneously engaging a common workpiece. Each motor has a push button for controlling its connection to the generator A. These buttons are indicated at 4, 4' and 4", and are of the type that may be locked in the "in" position after they have been pressed, by giving them a slight turn. Each motor, furthermore, has a speed matching device (shown at 5, 5' and 5"). These speed matchers are well known, and therefore need no detailed description. It is sufficient to state that each of them comprises a machine similar to a polyphase wound-rotor induction motor. The stator of the machine is connected to one source of alternating current, and the rotor to the other which it is desired to match with the first. Any difference in the frequencies causes a mechanical movement which can be taken advantage of to adjust the frequency to be matched with the other. In the present instance, the speed matchers serve to vary the excitation of the field windings of the motors 1, 2 and 3, shown at F, F' and F".

For supplying alternating current to one of the windings of the speed matchers, alternating current generators 6, 6' and 6" are driven by the motors 1, 2 and 3 through a variable speed drive, such as a Reeves belt drive indicated diagrammatically at R. The other windings of the speed matchers are energized by a variable frequency generator 7 driven by a motor 7'. The motor 7' like the motors 1, 2 and 3 is supplied with the current by the generator A.

The voltage of the generator A is controlled by motor-operated rheostats 8 and 9. A sequence switch 10 prevents reversal of the polarity of the generator A until the excitation of the generator field has been reduced to a minimum. A voltage relay 11 and a contact 12 actuated by the rheostat 8 further control the operation of the system in a manner to be explained more fully later. Holding relays 13 and 14 cooperate with the sequence switch 10. These relays are mechanically or otherwise interlocked to prevent simultaneous operation of both of them.

The speed of the motor 7', and therefore the frequency of the generator 7, is controlled by a rheostat 15. Limit switches 16 and 16' control the motor operating the rheostat 8. Push buttons 18 and 18' control the motor operating the rheostats 9 and 15.

A master controller 19 permits the motors to be manually started in either direction and stopped. An exciter bus 20 supplies excitation current to the field windings of the motors 1, 2 and 3. A variable voltage bus 21 delivers current from the generator A to the armatures of the motors. A variable frequency bus 22 delivers alternating current from the generator 7 to one side of the speed matchers 5, 5' and 5". The machines driven by the motors 1, 2 and 3 are indicated at 23, 23' and 23". A rheostat 24 permits adjustment of the value of the voltage on the bus 21 necessary to lock out any individual motor. Rheostats 25 and 26 permit manual adjustment of the degree of acceleration and deceleration of the motors 1, 2 and 3. The motor driving the rheostats 9 and 15 is shown at 27 and has forward and reverse field windings 27F and 27R. The motor driving the rheostat 8 is shown at 28. It has forward and reverse field windings 28F and 28R.

The remainder of the apparatus and the novel details of parts not already known will be described in the course of the following explanation of a complete cycle of operations.

When it is desired to enter a workpiece into the forming apparatus, push buttons 4 and 4' are operated and locked in. Motor 1 may, for example, be connected to drive the pinch rolls which feed the skelp into the first forming stand. Motor 2 may be connected to the first forming stand, motor 3 to the second forming stand, and other similar motors to the remaining stands. The rheostat 8 is normally in the position shown, with limit switch 16 open and limit switch 16' closed. The contact 12 is likewise open, and the contacts of relay 11 closed. The rheostats 9 and 15 may be in any position, as they merely determine the operating speed to which the motors will be set. The master controller is then moved to the forward position indicated by the dotted line F. This closes a circuit from one side of the exciter bus 20 through finger a, segments b and c and finger d of the controller 19, rheostat 26, limit switch 16', forward field winding 28F and motor 28 to the other side of the bus 20.

The motor 28 operates a bar 28a through a rack and pinion drive 28b. The bar has fingers 28c and 28d for operating the limit switches 16 and 16'. It also has a slot 28e for operating the sequence switch 10 through a ratchet and pawl drive 28g. The bar 28a also has a slot 28h for operating the contact 12. The motor 28, when energized, operates to shift the rheostat 8 to reduce the resistance in series with the field winding 29 of the generator A. When the rheostat has reached its extreme position, the limit switch 16' is opened. The switch 16 is closed shortly after the motor 28 starts, but has no effect until the controller is restored to neutral position. This deenergizes the motor 28. Contact 12 is closed by this operation of the rheostat 8. A circuit is also closed through segment e, finger f, the coil of relay 13, the sequence switch 10, and thence to the other side of the exciter bus 20. Relay 13 closes its contacts and completes a circuit through the operating coil 30F of a contactor 30 which closes its contacts 30a and 30b connecting the field 29 of the generator A in such manner as to cause it to generate voltage of a predetermined polarity on the bus 21.

The sequence switch 10 comprises a plurality of contact segments 10a insulated from each other but connected to a common conductor. A contact wiper or finger 10b is adapted to be actuated from one segment to the next on operation of the ratchet and pawl drive 28g. The circuit through the sequence switch is established by a brush 10c engaging a contact ring from which the finger 10b projects, and this circuit is broken momentarily on advancement of the finger 10b from one segment to the next.

The voltage across the bus 21 resulting from the energization of the field 29 energizes the relay 11. Before the relay 11 is energized, however, the closure of the contacts 12 has completed a circuit through contact 4x of the push button 4, the contacts of relay 11, the contact 12, contact 4z of the push button 4, and the operating coil of a relay 34 to the other side of the exciter bus 20. The relay 34 has locked itself in and completed a circuit for the operating coil of a contactor 31 which connects the armature of motor 1 to the bus 21. The circuit for the relay 34 will not be completed unless the contacts of relay 11 and switch 12 are closed.

The motor 7' is connected to the bus 21 so it and the motors 1 and 2 start as the voltage on the bus 21 builds up, motor 2 being connected to the bus 21 in the same manner, and at the same time as motor 1. Motors 1 and 2 will operate in synchronism therewith, the speeds of the motors being governed by the frequency on the bus 22. If either motor tends to vary from its definite speed setting, its speed matcher will vary the resistance in the field circuit, to compensate for the speed variation, until the frequency of its auxiliary generators (6, 6' and 6") matches that of the variable frequency bus 22. The speeds of the motors are definitely set by the rheostats 9 and 15, and the motors can be accelerated or decelerated together by operating these rheostats. The rheostat 9, of course, varies the excitation of the generator A while the rheostat 15 varies the speed of the motor 7' driving the variable frequency generator 7. The rheostats 9 and 15 are constructed to operate in sequence, i. e., after one has effected the full adjustment of which it is capable, the other comes into operation.

To stop the motors 1 and 2, it is only necessary to move the controller 19 back to the illustrated position. The finger f disengages the segment e, but relay 13 remains locked in. A circuit is completed from segment b through finger g, rheostat 25, limit switch 16, field winding 28R and motor 28, causing the latter to reset the rheostat 8 to the position of maximum resistance. When the rheostat reaches its extreme position, the sequence switch 10 is operated. This momentarily breaks the circuit of holding relay 13. The deenergization of the latter opens the circuit for the field contactor 30. The sequence switch 10 opens its circuit only momentarily to permit the deenergization of the holding relay 13, reclosing it to prepare for the next operation. The motor 28 is stopped by the limit switch 16 and the contact 12 is opened. The voltage across the bus 21 disappears with the opening of the field 29 of the generator A, deenergizing relay 11, and permitting it to close its contacts. The armatures of motors 1 and 2, however, remain connected to the bus 21.

While restoration of the controller 19 to off position opens the energizing circuit for the relay 13, the latter remains energized, being self-holding, until the circuit through the sequence switch 10 is temporarily opened. This does not occur until the rheostat 8 has been restored to the "all-resistance-in" position. The circuit for the relay 13, of course, cannot be reestablished until the master controller is again operated.

When the controller is restored to the off position, the momentum of the moving parts tends to drive the motors 1, 2 and 3, operating them as generators to supply current to the generator A, operating it as a motor to drive the motor M as a generator. The degree of deceleration of the system accomplished by this regenerative braking will depend on the excitation of the fields of the motors and the generator. Varying the speed of the motor 28 driving the rheostat 8 will also change the rate of deceleration, the faster the movement of the rheostat, the greater the rate of deceleration. To further increase the rate of deceleration, the rheostat 9 can be operated, to increase the excitation of the motor 7' and decrease the voltage of the generator A successively. The speed matching devices 5, 5' and 5" keep all the motors synchronized regardless of the rate of deceleration employed.

If it is desired to reverse the motors 1, 2 and 3, this may be accomplished by moving the master controller 19 to the position indicated by the dotted line R. This operation completes a circuit from one side of the exciter bus 20 through finger $a$, segment $b$, segment $h$ and finger $d$ of the controller to rheostat 26, as in the case of the forward movement of the controller. Another circuit is closed through the segment $i$ and finger $j$ to energize the relay 14, and thence through the sequence switch 10. The relay 14 operates and locks itself in. The operating coil 32R of the field reversing contactor 30 closes its contacts 30c and 30d, to connect the generator field 29 in circuit with the rheostats 8 and 9, but with its terminals interchanged as compared to the forward operation. The polarity of the generator A is thus reversed, and the motors 1 and 2, as well as the motor 7', start in the reverse direction, accelerating as the rheostat 8 is operated. The motors will eventually attain the same speeds at which they are operating in the forward directions, unless an adjustment of the rheostats 9 and 15 is made. The stopping of the motors is accomplished in the manner already described.

The rheostats 25 and 26 permit the rates of acceleration and deceleration to be varied. The rheostat 24 is for the purpose of adjusting the voltage required to operate the lock-out relay 11. Mechanical adjustment of the relay may be used instead. If one of the motors, such as the motor 1, is disconnected from the bus 21. e. g., by releasing the push button 4, the relay 11 prevents it from being reconnected to the bus by resetting the button, until the voltage on the bus has dropped below the value necessary to operate the relay 11, since the contacts of the relay 11 are in series with the original energizing circuit of the relay 34, which controls the contactor 31. The contact 12 likewise prevents the motor 1 from being reconnected to the bus 21 until the rheostat 8 has been moved to the "all-resistance-in" position. It will be understood that the relay 11 controls the energizing circuits of the relays 34, 34' and 34" associated with the motors 2 and 3 in the manner already described referring to relay 34 and motor 1.

As long as the push buttons 4, 4' and 4" are held in closed position, the motors start as soon as sufficient voltage appears across the bus 21. If any push button has been left in the off position, it will be impossible to start the motor controlled by it so long as the voltage across the bus 21 is above a predetermined value. Such motor will be started with the others only after the other motors have been decelerated, as by moving the controller 19 to the off position.

The invention described greatly facilitates the setting up of a multi-stand mill. In accordance with the invention this result is accomplished as follows: The workpiece is advanced to the first roll stand, by a pair of feeding-in pinch rolls for example, and is driven through the stand by the driving motor thereof. The motors for driving the remaining stands are rendered inoperative by releasing their push buttons similar to 4, 4' and 4". When the leading end of the piece has passed through the first stand, it is stopped and inspected. If the desired degree of forming has been accomplished, the workpiece is moved forward to the next stand which is caused to be driven by operating its push button 4", and having passed therethrough is again stopped and inspected. If the proper amount of forming has not been effected after passage of the piece through each stand, the piece must be backed out of that stand by reversing the driving motors, the rolls thereof adjusted, and the piece fed therethrough again. This procedure is repeated until the piece has passed entirely through the mill, and the mill is then ready for continuous operation in the forming of successive skelp lengths.

Even after the mill has been set up, however, there may be occasions for when it is desirable to stop the mill, reverse it, or operate it in either direction at creeping speed.

It will be apparent from the foregoing description that the invention provides a highly useful control system for a plurality of motor driving apparatus engaging a single workpiece. The motors may be simultaneously started, stopped and reversed, accelerated and decelerated, and perfect synchronism or maintenance of desired speed ratios is assured at all times. The speed of each individual motor may be adjusted or the speeds of all motors may be varied simultaneously. As stated, the invention greatly facilitates the "setting-up" of a multi-stand forming mill, as well as the routine operation thereof. It is particularly useful when a mill is to be set for a size of product different from that previously made. The rolls of the first stand may be adjusted or changed and the material can be fed thereinto to check the adjustment or change, while the rolls of the second stand are being adjusted or changed, and this sequence continued until all stands have been changed and checked. The motors normally driving the stands being adjusted or changed are rendered inoperative by releasing their push buttons 4, 4' and 4". Since the motors are driven at proper relative speeds at all times, scoring or buckling of the material is avoided. Quick reversal of the master controller cannot cause any injury to the system because the rheostat 9 automatically reduces the voltage on the bus 21 gradually, and reversal thereof is prevented until the voltage has dropped below predetermined value.

While I have illustrated and described herein but one preferred embodiment of the invention, changes therein may be made without departing from the spirit of the invention or the scope of the appended claims.

I claim:

1. A control system for a plurality of motors comprising a variable-voltage current source connected to said motors, means for controlling the voltage of said source, means separate from said voltage-control means, for reversing said motors simultaneously, said motor-reversing means and voltage-control means being interlocked to prevent reversal of the motors until the speed of said motors has been reduced to a predetermined safe value.

2. In a control system for a plurality of motors, a common current source therefor, a switch for connecting each motor to said source, means for closing said switches, and means for preventing operation of said switch-closing means when the voltage of said source is above a predetermined value.

3. In a control system for a plurality of motors, a variable-voltage current source therefor, means for varying the voltage of said source to vary the speed of said motors simultaneously, and means for maintaining the speeds of said motors at predetermined ratios, said last-mentioned means including a master frequency generator, individual speed-control means for each motor, speed matchers for controlling the motor speeds individually in accordance with said frequency, and a unitary control device effective to vary the voltage of said source and the frequency of said master frequency generator individually and successively in a predetermined order.

4. A control system for a plurality of motors including a variable-voltage source of current common to said motors, means for simultaneously varying the speeds of all said motors, a master controller for starting and stopping said motors, means responsive to said controller for varying the voltage of said source, independent means actuated by said controller for reversing said motors, and means interlocking the voltage control means and the reversing means to prevent reversing of said motors in response to operation of said master controller until the voltage of said source is below a predetermined safe value.

5. In a work-feeding means, a plurality of auxiliary motors driving said means, individual means for varying the speeds of the motors, a common generator for supplying energy to the motors, means for varying the voltage of said generator, means for connecting said motors to said generator, and means for preventing any of said motors from being connected to said generator so long as any substantial voltage exists across the generator.

6. In a work-feeding means, a plurality of auxiliary motors driving said means, individual means for varying the speeds of the motors, a common generator for supplying energy to the motors, means for varying the voltage of said generator, means for connecting said motors to said generator, and means for preventing any of said motors from being connected to said generator while the voltage thereof exceeds a predetermined value, said last-mentioned means being ineffective when the generator voltage is below said value.

JAMES V. CAPUTO.